(12) United States Patent
Morin et al.

(10) Patent No.: US 7,012,728 B2
(45) Date of Patent: Mar. 14, 2006

(54) ELECTROCHEMICAL DEVICE, SUCH AS AN ELECTRICALLY CONTROLLED SYSTEM WITH VARIABLE OPTICAL AND/OR ENERGY PROPERTIES

(75) Inventors: Claude Morin, Puteaux (FR); Fabien Beteille, Paris (FR); Jean-Christophe Giron, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/819,972

(22) Filed: Apr. 8, 2004

(65) Prior Publication Data

US 2004/0191618 A1 Sep. 30, 2004

Related U.S. Application Data

(63) Continuation of application No. 09/700,684, filed as application No. PCT/FR00/00675 on Mar. 17, 2000, now Pat. No. 6,747,779.

(30) Foreign Application Priority Data

Mar. 19, 1999 (FR) .................................. 99 03420

(51) Int. Cl.
*G02B 1/15* (2006.01)
*G02B 1/03* (2006.01)
*G02B 1/153* (2006.01)

(52) U.S. Cl. ...................... 359/265; 359/275; 359/254; 359/269; 359/273

(58) Field of Classification Search ................ 359/265, 359/237, 275, 254, 251, 252, 269, 270, 271, 359/273, 274; 204/450, 600; 315/106
See application file for complete search history.

(56) References Cited

U.S. PATENT DOCUMENTS

| | | | |
|---|---|---|---|
| 3,800,065 A | 3/1974 | Bunish et al. | ............... 174/115 |
| 4,084,314 A | 4/1978 | Chakrabarty et al. | ......... 29/843 |

(Continued)

FOREIGN PATENT DOCUMENTS

EP 0 400 797 12/1990

(Continued)

OTHER PUBLICATIONS

JP57-056824 (Abstract Only) Apr. 15, 1982.

*Primary Examiner*—Timothy Thompson
(74) *Attorney, Agent, or Firm*—Oblon, Spivak, McClelland, Maier & Neustadt, P.C.

(57) ABSTRACT

An electrochemical device includes at least one carrier substrate, and a stack of functional layers including at least one electrically conducting layer that includes metal oxide(s), and a multicomponent electrode including at least one electrochemically active layer, at least one higher-conductivity material and at least one network of one of conducting wires and conducting strips. The higher-conductivity material has a surface resistance that is lower than a surface resistance of the electrically conducting layer. The stack of functional layers is arranged between two substrates, and each may be rigid, of glass type or rigid polymer or semi-rigid or flexible of PET type.

19 Claims, 3 Drawing Sheets

U.S. PATENT DOCUMENTS

| | | | |
|---|---|---|---|
| 4,326,017 A | 4/1982 | Will | 429/778 |
| 4,874,229 A * | 10/1989 | Ito et al. | 359/275 |
| 5,554,176 A | 9/1996 | Maddison et al. | 607/9 |
| 5,846,854 A | 12/1998 | Giraud et al. | 359/604 |
| 5,985,486 A | 11/1999 | Giron | 429/188 |
| 6,166,848 A * | 12/2000 | Cammenga et al. | 359/267 |
| 6,301,039 B1 | 10/2001 | Tench | 359/604 |
| 6,304,363 B1 | 10/2001 | Lynam | 359/275 |
| 6,337,758 B1 | 1/2002 | Beteille et al. | 359/365 |
| 6,700,692 B1 | 3/2004 | Tonar et al. | 359/275 |
| 6,791,737 B1 * | 9/2004 | Giron | 359/265 |
| 2002/0154379 A1 | 10/2002 | Tonar et al. | 359/267 |

FOREIGN PATENT DOCUMENTS

| | | |
|---|---|---|
| EP | 0 612 826 | 8/1994 |
| WO | 92/18896 | 10/1992 |
| WO | 93/21557 | 10/1993 |
| WO | 94/15247 | 7/1994 |

* cited by examiner

ELECTROCHEMICAL DEVICE, SUCH AS AN ELECTRICALLY CONTROLLED SYSTEM WITH VARIABLE OPTICAL AND/OR ENERGY PROPERTIES

CROSS-REFERENCE TO RELATED APPLICATIONS

This application is a continuation of U.S. application Ser. No. 09/700,684, filed Jan. 10, 2001, now U.S Pat. No. 6,747,779 and further is based upon PCT application PCT/FR00/00675, filed Mar. 17, 2000 and claims the benefit of priority from the prior French Patent Application No. 99-03420, filed Mar. 19, 1999, the entire contents of each of which are hereby incorporated herein by reference.

BACKGROUND OF THE INVENTION

1. Field of the Invention

The invention relates to electrochemical devices, in particular of the type comprising at least one carrier substrate provided with a stack of functional layers comprising at least one electrically conducting layer and at least one electrochemically active layer. More particularly, the invention envisages electrically controllable systems having variable optical and/or energy properties, in glazing applications or mirror applications.

2. Discussion of the Background

The reason for this is the increasing demand for so-called "smart" glazing whose properties are capable of variation.

Thus, from the thermal standpoint, glazing whose transmission/absorption can be

Thus, from the thermal standpoint, glazing whose transmission/absorption can be varied within at least part of the solar spectrum allows the solar heat influx into rooms or passenger areas/compartments to be controlled when it is fitted as external glazing in buildings or as windows in means of transportation of the type comprising cars, trains, aircraft, etc., thus allowing avoidance of excessive heating of the latter in strong sunlight.

From the optical standpoint, the glazing allows the visibility to be controlled, and when it is installed as exterior glazing this makes it possible to prevent glare in strong sunlight. It may also have a particularly advantageous shutter effect, either used as exterior glazing or if used as interior glazing, for example for equipping internal partitions between rooms (offices in a building), or for isolating compartments in trains or aircraft.

There are many other applications: for example, glazing having variable-light transmission/reflection may be used to make rear-view mirrors, which can darken as required in order to prevent dazzling of the driver of the car. They may also be used for road sign panels, or for any display panel, for example so as to reveal the pattern or message only intermittently, in order to attract greater attention.

One particularly interesting application of systems having variable light absorption relates to display screens, in particular those with which televisions and computing hardware are equipped. The reason for this is that this type of glazing makes it possible to improve the contrast of the image, especially taking ambient brightness into account.

The interest which glazing of this type can arouse is the reason for the many systems which have already been studied.

Two systems are of more particular interest for the invention: viologenic systems and electrochromic systems.

Viologenic systems allow the transmission or absorption of glazing which incorporates them to be modified, essentially in the visible region. They generally comprise just one "active layer" based on polymer, on gel or on liquid comprising a so-called cathodic active material, such as viologenic molecules, together with a so-called anodic active material, such as dime thylferrocene or phenazines. Some examples of these are described in patents EP-0 612 826 and U.S. Pat. No. 5,239,406.

As is known, electrochromic systems include a layer of an electrochromic material capable of reversible and simultaneous insertion of ions and electrons and whose oxidation states corresponding to the inserted and ejected states have a distinct colour, one of the states having higher light transmission than the other, the insertion or ejection reaction being controlled by a suitable electrical supply. The electrochromic material, usually based on tungsten oxide, must therefore be placed in contact with a source of electrons, for example a transparent electrically conducting layer, and with a source of ions (cations or anions), for example an ionic conductive electrolyte.

It is moreover known that, in order to secure at least about a hundred switching operations, there must be associated with the layer of electrochromic material a counterelectrode which is itself capable of reversibly inserting cations, symmetrically with respect to the layer of electrochromic material so that, macroscopically, the electrolyte appears as a single ion medium.

The counterelectrode must consist of a layer which is either neutral in colour or at least transparent or with little colour when the electrochromic layer is in the coloured state. As tungsten oxide is a cathodic electrochromic material, that is to say a material whose coloured state corresponds to the most reduced state, the material used for the counterelectrode is generally an anodic electrochromic material based on nickel oxide or on 20 iridium oxide. It has also been proposed that the material used be optically neutral in the oxidation states concerned, for example cerium oxide or organic materials such as electronically conductive polymers (polyaniline, etc.) or Prussian blue.

A description of systems of this type is found, for example, in European Patents EP-0 338 876, EP-0 408 427, EP-0 575 207 and EP-0 628 849.

Currently, these systems may be arranged in two categories, according to the type of electrolyte which they use:

either the electrolyte is in the form of a polymer or of a gel, for example a polymer exhibiting protonic conduction, such as those described in European Patents EP-0 253 713 and EP-0 670 346, or a polymer exhibiting lithium-ion conduction, such as those described in Patents EP-0 382 623, EP-0.518$^+$754 or EP-0 532 408, or the electrolyte is an inorganic layer which is ionically conductive but electronically insulating; these systems are referred to as "all-solid" electro-chromic systems. For the description "all-solid" applied to an electrochromic system reference may be made to the European Patent Applications EP-0 867 752 and EP-0 831 360.

There are other types of electrochromic systems. Mention may therefore be made of "all-polymer" electrochromic systems, where two electrically conducting layers are arranged on either side of a stack comprising a cathodic-colouring polymer, an electrically insulating but ionically conductive polymer (very particularly conductive for H$^+$ or Li$^+$) and finally an anodic-colouring polymer (such as polyaniline or polypyrrole).

Finally, there are also "active" systems in the sense of the invention which combine viologenic materials and electrochromic materials, for example having the sequence conducting electrode/inorganic layer or polymer having electrochromic properties/ layers (liquid, gel, polymer) having viologenic properties/conducting electrode.

These systems comprising reversible insertion material(s) are of particular interest in the sense that they allow modification of absorption within a wavelength region which is wider than that for viologenic systems: they can absorb variably not only in the visible region but also, in particular, in the infrared region, and this can make them useful optically and/or thermally.

A point which is common to these different systems, described below by the term "active" systems is that their transmission/absorption state is con-trolled by applying a potential difference to their terminals, generally formed by two electrically conducting layers between which the electrochemically active layer(s) lie(s). When these systems are part of "active" glazing, the electrically conducting layers are preferably transparent (or at least one of them is transparent if the other is chosen to reflect in the visible region in a mirror application). The material needed when selecting the nature of these electrically conducting layers has therefore to be both sufficiently conductive and sufficiently transparent in the ranges of thickness usually encountered in the field of thin layers. The selection usually concentrates on a doped metal oxide material, such as fluorine-doped tin oxide ($SnO_2$:F) or tin-doped indium oxide (ITO), which may be laid down on various substrates, either hot (in particular by pyrolysis on glass, as in the CVD method) or cold (vacuum techniques of cathodic sputtering type).

However, it has been found that, at thicknesses at which they are still transparent, layers based on this type of material are not fully satisfactory even though they do permit the functioning of active systems.

They are insufficiently conducting and increase the response time of the active systems on application to their terminals of an electrical supply appropriate to change their transmission/adsorption state (the state described below for greater simplicity by the term "coloration" state, even if the modification of properties also operates outside the visible region).

In addition to the fact that they reduce the switching speed of the systems ("switching" or "response time" being the period of time necessary for the entire active system to have changed its coloration state) the layers contribute to the creation of an edge phenomenon, i.e. non-uniformity in the change of state of the system within its surface, with a change in "coloration" in the sense of the invention which is almost immediate in the zones near to the current leads supplying the electrically conducting layers, arranged at the periphery of the systems, and which propagates progressively toward the centre of the surface of the active systems. Now, in certain applications, in particular glazing for buildings or automobiles, the final user generally desires the fastest possible response time and may, in addition, prefer a progressive, uniform change of coloration over the entire surface of the active glazing.

The object of the invention is therefore to improve the performance of the electrically conducting layers of the "active" systems defined below, and very particularly of "active" glazing comprising these latter, the improvement being aimed in particular at their electrical conductivity in association with their optical properties.

SUMMARY OF THE INVENTION

A first object of the invention is an electrochemical device, in particular an electrically control-lable system having variable energy and/or optical properties, including at least one carrier substrate provided with a stack of functional layers comprising at least one electrically conducting layer A based on metal oxide(s) and at least one electrochemically active layer F. The invention consists in the fact that said layer A is part of a multicomponent electrode E combining with the layer A at least one higher-conductivity material B and/or at least one network C of conducting wires or conducting strips.

For the purposes of the invention, "higher-conductivity" describes a material B which, in the form of a layer, has a surface resistance "surface R" lower than that of the layer A. For the purposes of the invention, again, "combination" indicates that the elements concerned are electrically connected one to the other, either by direct contact or else through conducting elements/layers.

The reason for this is that increasing the thickness of the layer A to heighten its conductivity (i.e. lower its surface resistance) is a limited solution: firstly in terms of cost and of manufacturing time for the layer in question and secondly in terms of optical appearance: above a certain thickness layers of this type begin to absorb in the visible region. Now, very particularly for active glazing, as required by its application, it is generally desirable to ensure maximum light transmission in the "uncoloured" state. The solution according to the invention has therefore consisted in reconciling conductivity and transparency by developing two versions, alternative or cumulative.

The material B defined above may be combined with the layer A in two different ways: according to a first version it may be in the form of at least one layer combined with A and in electrical contact therewith.

The characteristics and thicknesses of the layers may then be optimized so that the multicomponent electrode which combines them has, overall, the required levels of transparency and surface resistance.

A second version consists in incorporating the material B in the layer A, in particular in the form of fibres or of small particles. It is also possible to use a layer A based on doped oxide, for example $SnO_2$:F, which is laid down in a known manner by liquid pyrolysis using appropriate organometallic precursors and adding, to the liquid phase comprising these precursors, fibres or metallic particles, or spraying them at the surface of the substrate simultaneously with the liquid phase (for example fibres with a diameter of the order of 10 $\mu$m and a length of about 1 mm). The location of the fibres in 25 the layer is random, "percolating" over the surface of the substrate coated in this way. In this situation the doped metal oxide of the layer A also fulfils the function of fixing the metallic fibres B.

The third version consists in combining the layer(s) of type A with a network of conducting elements, in particular based on a metal of intrinsically higher conductivity than the material of type A. Actually, as described in detail below, this network may be composed of linear elements visible to the eye at close quarters but sufficiently discreet to be compatible with most of the applications envisaged in glazing for buildings or for vehicles. It is then advantageous for these elements to be dimensioned and arranged so that their visibility is as low as possible. Generally, success can be obtained by making this network almost impossible to discern, at least when the system is in the coloured state.

It will be noted that, in the same active system, these different versions are alternative or cumulative.

The point common to these versions is that the additional conducting element, namely the material B or the network C, allows the overall electrode formed in this way to overcome a threshold of conductivity, so that the entirety of the electrode experiences the same potential difference at almost the same time as soon as the voltage is applied to the system, and this significantly reduces the switching time and reduces or even eliminates the "coloration front" effect mentioned above. And this highly interesting technical result is not obtained by compromising the optical quality of the system if:

- either this additional element itself has little or no absorbency in the visible region, so that being transparent it does not noticeably change the appearance of the glazing or the range of transmission/absorption within which variation can be made using the action of an electrical supply (type B layer),
- or this additional element is sufficiently discreet not to have any adverse effect on the overall aesthetics of the active system (type C network).

The layer(s) A is/are advantageously based on metal oxide rendered conductive by doping. This may in particular be doped tin oxide, in particular doped with a halogen of the type comprising fluorine ($SnO_2$:F) or with antimony ($SnO_2$:Sb), or zinc oxide doped, for example, with aluminium (ZnO:Al) or with tin (ZnO:Sn) or with fluorine (ZnO:F) or with indium (ZnO:In). It may also be tin-doped indium oxide, such as ITO.

According to the first version the layer(s) B is/are advantageously essentially metallic, in particular based on at least one noble metal or based on an alloy comprising a noble metal of the type comprising silver Ag or gold Au or copper Cu or aluminium Al. The layer selected is preferably one based on an alloy of silver with another metal, such as nickel or titanium. The reason for this is that it makes the layer much less susceptible to oxidation, in particular when it is in electrical contact with layers of electrochromic materials in an "all-solid" system. Gold is a material even less susceptible than pure silver to oxidation, but it is less satisfactory from an optical standpoint, being less neutral in transmission. The combination of a type A layer and a type B layer is of particular interest: as already seen, it allows sufficient enhancement of the electrical conductivity of type A layers with layers B which have low thickness and therefore no excessive adverse optical effect. This is also a novel means of incorporating layers B in electrodes, in particular silver layers, the use of which has hitherto posed the problem of protecting these from attack, in particular by oxidants. Thus type A layers can be used to "protect" type B layers, in particular from oxidation/degradation, the layers A having a double function as protection and electrical conductor, indeed a triple function with an added optical function when the thicknesses of the type A layers are adjusted as a function of those of the type B layers to optimize the optical appearance of the entirety by interference interaction between these different layers. It is thus possible, for example, to reduce the light reflection induced by the layer B.

As mentioned above, the characteristics of the layers incorporated in the multicomponent electrodes of the invention are chosen so that they are essentially transparent in the visible region.

According to the second version the small elements of the type comprising fibres, particles or grains which are incorporated in the layer may be of the metal also mentioned for the layer B: Ag, Au, Cu, Al, or else based on steel, Cr, Ni alloy, etc.

In a first embodiment of the third version of the invention, the network C advantageously includes a plurality of conducting strips, in particular essentially parallel each to the other and obtained by metal and a low-melting-point frit in an organic binder. The screen printing may be carried out on a glass-type carrier substrate, which may then be covered with at least one electrically conducting layer A in order to form an electrode according to the invention. One version consists in carrying out the opposite operation, namely laying down the network C on the electrically conducting layer A. The technique of deposition by screen printing on glass is known per se for laying down conducting networks for other applications, and very particularly for forming heater networks for vehicle glazing, in order to allow demisting or defrosting by resistance heating. For further details of this technique reference may be made, for example, to the patents FR-1 464 585 and EP-0 785 700. Since the desired function here is different, the specialist will need to determine the strip width and the strip spacing which are most appropriate to give the best compromise between conductivity and aesthetics (for example a strip width of 0.1 to 0.5 mm and a strip spacing of 1 to 5 mm).

According to a second embodiment, the network C includes a plurality of essentially metallic conducting wires, preferably surface-laid on a sheet based on thermoplastic polymer. As for the first embodiment, there are known techniques for laying down conducting wires on films, for example polyvinyl butyral films, which are combined by lamination with glass to form laminated glazing, the network having a demisting/defrosting function by means of resistance heating. It is therefore possible to adapt these techniques, optionally with adjustment of the configuration, the spacing and the dimensioning of the wires, to design a network which, combined with the thermoplastic film, will be pressed onto the type A layer, itself arranged on the remainder of the stack of functional layers of the active system, in particular by a lamination technique. For further details concerning the technique of laying down these wires reference may be made, in particular, to the patents EP-0 785 700, EP-0 553 025, EP-0 506 521 and EP-0 496 669. The wires may be laid down in the form of curves or straight lines. In outline the process consists in using a heated pressure roll to press the wire onto the surface of the thermoplastic film, the wire being fed to the pressure roll from a supply reel with the aid of a wire-guiding device.

According to another embodiment, there may be a wider interpretation of the network C, and this may in particular be two-dimensional, in the form of a fabric, net or nonwoven obtained by weaving or knitting and sufficiently fine and/or with a sufficiently high mesh size not to impair visibility. There may also be introduction of this type of material between the sheet based on thermoplastic polymer which serves in particular for the lamination of the system and the type A layer.

This type of material, which is flexible, may preferably be obtained using metallic wires, in particular with a diameter between 10 $\mu$m and 100 $\mu$m. The mesh size, the spacing of the knit and the type of weaving may be modified as appropriate. Thus, preference is given to wires with a diameter of from 15 to 25 $\mu$m with a knit structure and with mesh spacings of the order of from 1 to 3 mm.

The "network" also comprises metallic layers of sufficient thickness to give a severe reduction in light transmission, or even to be opaque, and which undergo treatments so that they are rendered discontinuous. This may be a treatment by etching a metallic layer laid down by cathodic sputtering, where the etching may be effected by laser in order to leave "wires" (for example of width 0.3 mm and separation of 1.5 mn) or a two-dimensional grid. The metal in the layer may be stainless steel, copper, silvered copper, aluminium, or gold in particular.

It is also possible to treat the metallic layer by perforating it to give regularly distributed openings. This metallic layer may also be replaced by a perforated metallic sheet inserted between the stack of the active system and the lamination intercalation (a sheet thicker than a layer, for example with a thickness of from 10 to 100 $\mu$m).

If the substrate is sufficiently rigid, as is glass, it is also possible to adapt the screen-printing technology described above by etching shallow lines on the surface of the glass, parallel lines which will be filled with the screen-printing paste, giving a screen-printed network which is particularly discreet and is at the same time conducting.

Provision may advantageously be made for the two-dimensional network C of grid or fabric type, even in the event that it is self-supporting, to be embedded at the surface of the thermoplastic polymer film serving for lamination of the glazing. It may have been preembedded, like the conducting wires mentioned above. It may also be embedded in the film during the course of the lamination.

Rather than the screen printing of conducting wires, these wires may be laid down, for example as tungsten wires, on substrates which may have been previously provided with a conducting layer of doped metal oxide type, and retained at the periphery of the glazing by means of a suitable double-sided adhesive, which can also have a sealing function.

In one preferred embodiment of the first version according to the invention, the multicomponent electrode comprises at least one layer A and at least one layer B in electrical contact, at least one of these optionally being in contact with at least one layer D of dielectric material, and all of the superposed layers A, B and D preferably forming a stack of layers with interference interaction. The stacks of layers found here may actually be rather similar to those used as low-emission/solar protection stacks for glazing in buildings or vehicles, stacks of the 5 following outline type:

dielectric coating ①/silver/dielectric coating ②, with optionally a fine layer of protective metal at the Ag/dielectric interface. The dielectric coating may be a layer or superposed layers based on metal oxide ($SnO_2$, ZnO, $TiO_2$, $SiO_2$, $Ta_2O_5$, $Nb_2O_5$, etc.) or silicon nitride: or oxynitride (SiON, $Si_3N_4$) or a mixture. Reference may be made, for example, to the stacks described in patents EP-0 611 213, EP-0 678 484 and EP-0 71.8 200, or else those used to equip glazing marketed in the "Planitherm" range by Saint-Gobain Vitrage. The application here is different and it is therefore necessary to adapt these stacks by replacing one or both of the abovementioned dielectric coatings ① and ② with one or more doped oxide conducting layers (of type A). The interposition of electrically insulating layers between the superposed conducting layers and the rest of the active layers in the system must be avoided. On the contrary, there is no reason not to add dielectric insulating layers to the conducting stacks of type (layer A/layer B) or (layer A/layer B/layer A) on the opposite side from the remainder of the functional layers, for example on the side facing the carrier substrate. The resultant stacks may be of the type:

substrate/dielectric D/layer B (Ag type)/layer A (ITO type)/remainder of the functional stack in the active system.

These layers D then fulfil an optical function and/or a function of anchoring type B layers to the substrate, and/or fulfil a function as a barrier to the migration of species coming from the substrate (for example alkalis coming from the glass). As mentioned above, the dielectric materials may be in the form of oxide, oxycarbide or oxynitride of a metal or silicon, or be based on silicon nitride.

Some examples of this type of electrode are ITO/Ag/ITO, Ag/ITO and dielectric/Ag/ITO with optional interposition of thin layers of partially oxidized metal at the Ag/ITO interface, the second ITO layer protecting the silver layer while participating in the electrical conductivity of the entirety.

The multicomponent electrodes according to the invention are provided with appropriate current leads of a type known in the art, in particular in the form of metal braids or shims.

As mentioned above, the invention is particularly applicable to an electrochromic system with at least one carrier substrate and a stack of functional layers comprising at least, in succession, a first electrically conducting layer, an electrochemically active layer liable to reversible insertion of ions, such as $H^+$, $Li^+$ or $OH^-$, of anodic or, respectively, cathodic electrochromic material type, a layer of electrolyte, a second electrochemically active layer liable to reversible insertion of ions, such as $H^+$, $Li^+$ or $OH^-$, of cathodic or, respectively, anodic electro-chromic material type, and a second electrically conducting layer, with at least one of the electrically conducting layers in the form of a layer A based on metal oxide(s) and being part of a multicomponent electrode E.

It is also applicable to any viologenic system with at least one carrier substrate and a stack of functional layers comprising at least, in succession, a first electrically conducting layer, a film having viologenic properties in the form of a polymer, of a gel or of a suspension in a liquid medium, and a second electrically conducting layer, with at least one of the two electrically conducting layers being of type A based on metal oxide(s) and being part of a multi-component electrode E.

The invention thus relates to all the types of "active" system described in the preamble to the present application.

According to the invention it is advantageous for the stack of functional layers to be arranged between two substrates, each of which may be rigid, of glass type or rigid polymer, such as polycarbonate or PMMA (methyl polymethacrylate), or semi-rigid or flexible of PET type (polyethylene terephthalate), all of these being preferably transparent. They may also be absorbent or otherwise.

Another subject of the invention is glazing incorporating the device/active system described above, said device using as carrier substrate at least one of the rigid constituent substrates of the glazing and/or at least one flexible substrate combined by lamination to one of the rigid constituent substrates of said glazing.

Another subject of the invention is the use of the device and of the glazing described above for making glazing for buildings, in particular exterior glazing or internal partition glazing or door glazing or roof windows, glazing equipping internal partitions or windows or roof windows in means of transport of the type comprising trains, aircraft, cars and boats, glazing for display screens of the type comprising computer or television screens, or touch screens, or spectacles, camera lenses or protection for solar panels.

Another subject of the invention is the use of the device described above for making electrochemical energy-storing devices of battery or fuel-cell type, and the batteries and cells themselves. The reason for this is that it is of very particular interest for battery applications to use the version of the invention consisting in the use of an electrode comprising a perforated metallic sheet or metallic grid. Since batteries are frequently produced on rather thin plastic substrates (of PET type, about 30 μm) if the conducting layers are flexed they are in danger of losing their electrical continuity. A thicker metallic "grid" allows this continuity to be assured more effectively.

BRIEF DESCRIPTION OF THE DRAWINGS

The advantageous characteristics and details of the invention are apparent from the description below of various non-limiting embodiments, with reference to the attached drawings, which show:
☐ in FIG. 1: viologenic glazing according to the invention
☐ in FIG. 2: a first example of electro-chromic glazing of "all-solid" type according to the invention
☐ in FIG. 3: the optical and electrical 15 characteristics of the glazing according to FIG. 2
☐ in FIG. 4: a second example of electro-chromic glazing of "all-solid" type according to the invention.

DESCRIPTION OF THE PREFERRED EMBODIMENTS

To make the figures easier to read they are 20 highly diagrammatic and do not necessarily reflect the relative scale of the various elements which they show.

EXAMPLE 1

Figure 1A:
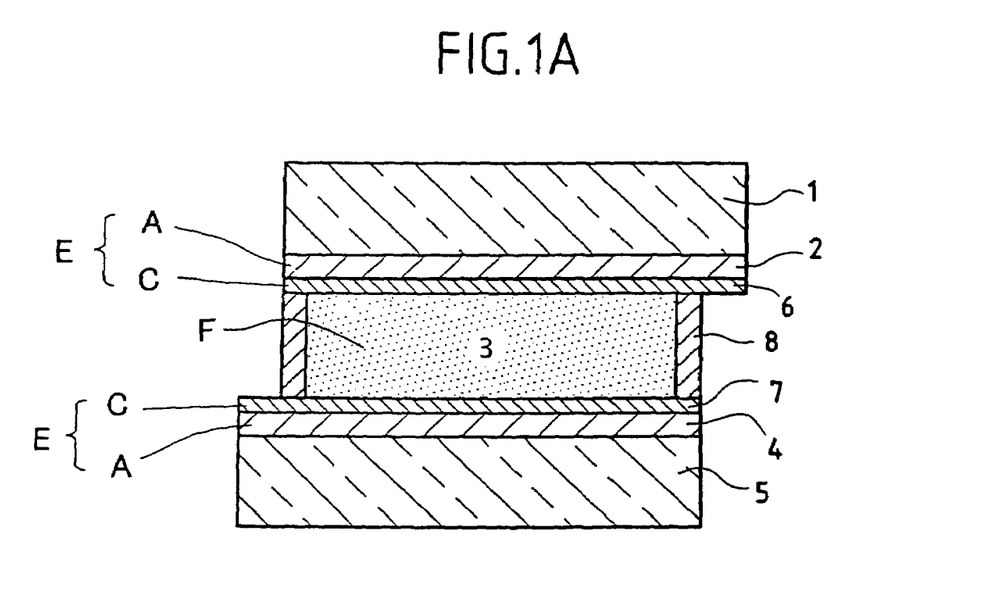
Figure 1B:
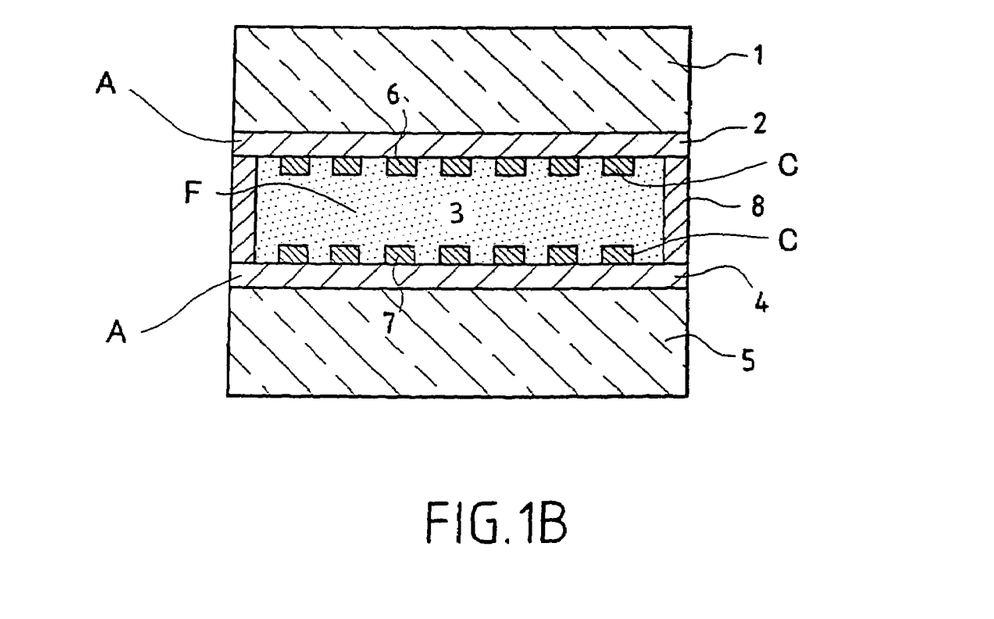

FIGS. 1a and 1b show a transverse section of a viologenic system using an "active" layer 3 of the type described in the abovementioned patent application EP-0 612 826 and based on polymer and arranged between two clear silica-soda-lime glass substrates 1 and 5 of 4 mm thickness. (FIG. 1b is a view taking a section at right angles to FIG. 1a).

The two substrates 1 and 5, each coated in advance with an $SnO_2$:F layer 2 and 4 and laid down in a known manner by CVD have each then been provided with a network 6 and 7 of conducting strips, using a silver paste and the well known technique of screen printing. The conducting strips have a width of 0.3 mm and are essentially parallel one to the other and separated one from the other by a distance of about 2 mm. A peripheral seal 8 ensures that the system does not leak.

There are therefore two multicomponent electrodes combining a screen-printed conducting network and a doped oxide layer. The layers of $SnO_2$:F may be replaced by a layer of ITO or $SnO_2$:Sb, for example, and have a thickness of about 400 nm. It will be noted that the addition of a screen-printed network which raises the conductivity of the electrode can allow the conducting layers laid down to be of lower thickness while retaining the benefits of the invention, namely a diminution in the coloration front effect and a smaller switching time. If the thickness of the layer of $SnO_2$:F (or ITO) is reduced in this way there can be a significant reduction in the cost of the active glazing. The current leads are formed by screen printing perpendicular to the screen-printed conducting strips, parallel and at equal distances of 2 mm.

EXAMPLE 2

Figure 2:
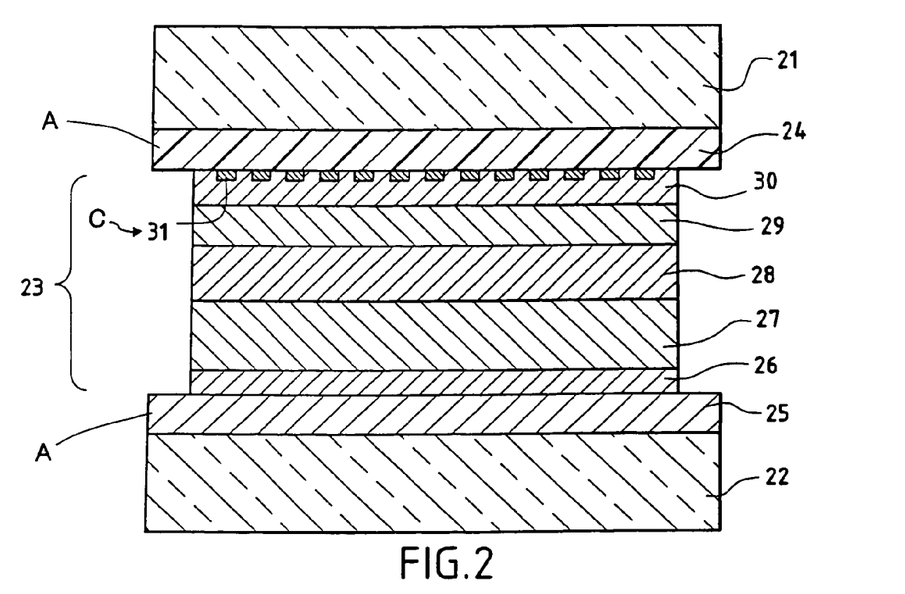

FIG. 2 represents an embodiment of electro-chromic glazing according to the invention: this is electrochromic glazing with a laminated structure and two panes of glass, in a configuration adapted, for example, for use as glazing in a car sun-roof: two clear panes of glass 21 and 22 are shown, with an electrochromic functional system 23 of "all-solid" type formed by the stack of functional layers which follows, and a sheet of polyurethane PU 24 (the sheet of PU may be replaced by a sheet of ethylene vinyl acetate EVA or of polyvinyl butyral PVB):
  a first 400 nm electrically conducting layer 25 of $SnO_2$:F, laid down on the glass 22 using CVD,
  a first 40 nm layer 26 of anodic electrochromic material made of (hydrated) iridium oxide $IrO_xH_y$ (which may be replaced by a layer of hydrated nickel oxide),
  a 100 nm layer 27 of tungsten oxide,
  a second 100 nm layer 28 of hydrated tantalum oxide,
  a second 370 nm layer 29 of cathodic electrochromic material based on tungsten oxide $H_xWO_3$,
  a second 50 nm layer 30 of ITO.

The entirety of glass pane 22,/functional system 23 is then laminated to glass pane 21 via the sheet 24 of PU of thickness at least 1.24 mm which has been functionalized by laying down a network 31 of linear metallic wires parallel one to the other. (It is also possible for this to be a sheet of EVA or of PVB, as stated above, for example with a thickness of the order of 0.76 mm).

The network is laid down in a known manner by the process described in the abovementioned patents. As is known, the current leads are two shims arranged on the opposing margins of the sheet 24 of PU, applied with the aid of a soldering iron. They may also be metallic wire braids. The electrical contact between these current leads (not shown) and the underlying electrically conducting layer is obtained by pressure, at the time of the lamination.

The glazing therefore uses a standard electrode on the glass pane 22, namely a monolayer of $SnO_2$:F (or of ITO, for example) and a second electrode according to the invention combining an electrically conducting layer of ITO with a network of metallic wires. As in Example 1, this configuration allows the use of ITO layers alongside the PU film which are thinner than those necessary in the absence of the conducting network 31. This network is formed, for example, by linear parallel wires, made of tungsten or of copper, optionally covered with graphite, of diameter 25 μm on average (for example between 10 and 50 μm). Each line is separated from the adjacent line by a distance of 2 mm (for example between 1 and 5 mm). This dimensioning is appropriate so that the network, although visible at very close quarters, is still very discreet and even invisible in the coloured state, an aesthetic 35 requirement which applies in the context of glazing for a car roof.

Figure 3:
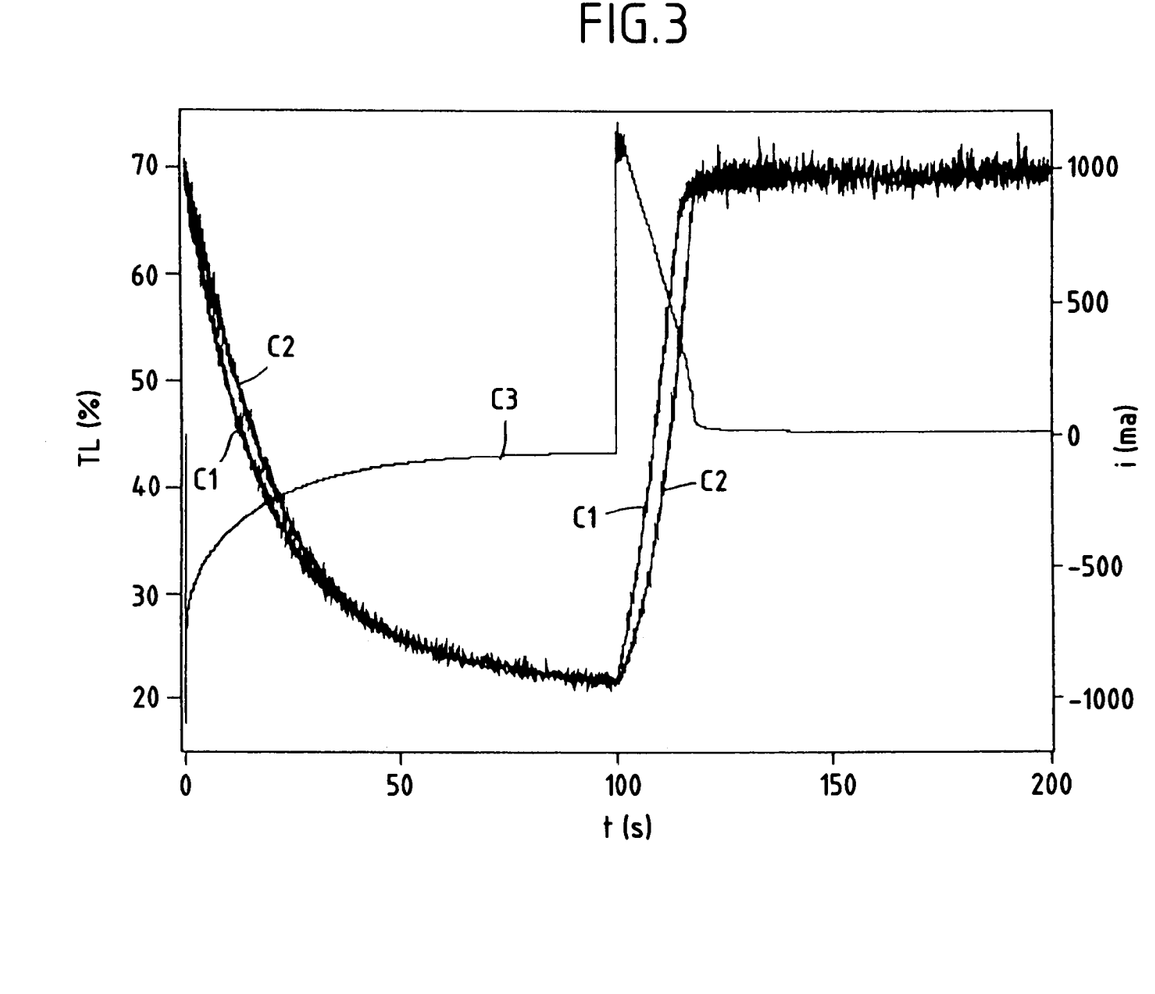

FIG. 3 indicates the optical and electrical behaviour of glazing according to this example and measuring 35×35 $cm^2$.

The graph 3 describes the optical appearance and the electrical behaviour of the glazing during switching. The X axis gives the time T expressed in second; and the Y axis (on the left) gives the value for light transmission $T_L$ expressed in % and (on the right) the current i in mA at the terminals of the glazing. The curve C1 gives the change in $T_L$ at the edge of the glazing and the curve C2 gives the change in $T_L$ at the centre of the glazing. It can be seen that the two curves are (almost) superposed, and this proves the absence or the virtual absence of coloration front. The curve C3 shows how the current i changes.

EXAMPLE 3

Figure 4:
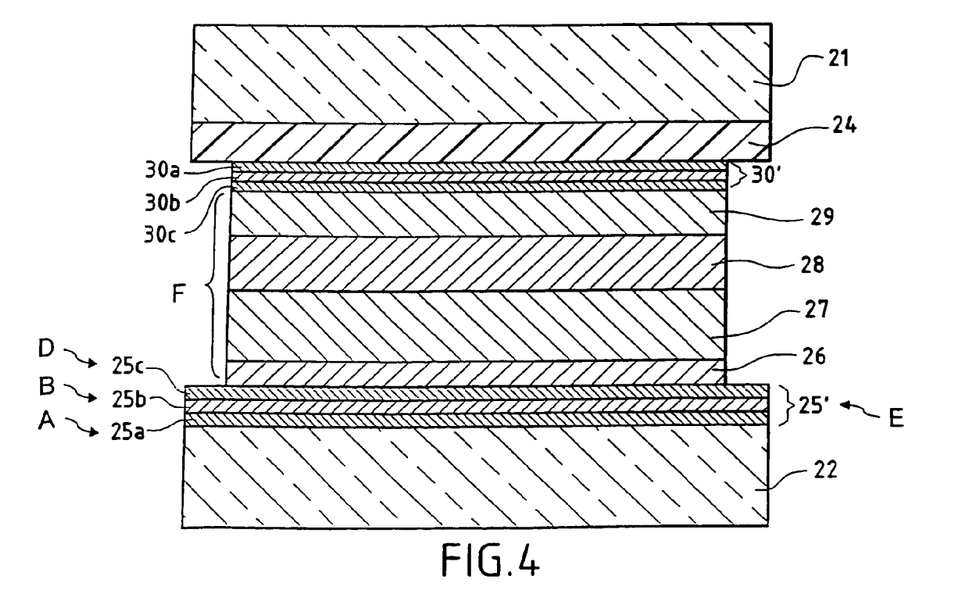

FIG. 4 shows another version of "all-solid" electrochromic glazing according to the invention. As in FIG. 2 and Example 2, two panes of glass 21 and 22 are seen, combined by lamination with the aid of a film 24 made of PU (or PVB: polyvinyl butyral), the layer 26 made of anodic electrochromic material, the layer 29 made of cathodic electrochromic material, these being separated by the layers 27 and 28, forming the electrolyte. By way of contrast, the electrode 25' arranged on the glass pane 22 is now formed by a stack of layers comprising a 34 nm layer 25 (*a*) of $SnO_2$ on which there is a 10 nm layer 25(*b*) of silver, on which there is in turn a 50 nm layer 25(*c*) of ITO. This three-layer structure is obtained by cathodic sputtering assisted by a magnetic field, in a known manner. The layer 25(*b*) of silver is optionally provided with a thin layer 25(*d*) of metal intended to protect it during laying down of the layer 25(*c*) of ITO, when this latter is laid down by a reactive method in the presence of oxygen.

The resultant stack is rendered highly conducting by the presence of the layer of Ag, the light reflection from which is lowered with the help of the underlying layer of $SnO_2$ and of the layer of ITO lying thereupon, which serve as antireflective layers, by appropriate choice of their thickness. It will be noted that it is necessary here for the layer 25(*c*) on the silver to be conducting in order to ensure that a voltage is applied to the remainder of the functional layers in the system, but this is not necessary for the layer 25(*a*) underneath the silver, which essentially has an optical function and which is an insulating dielectric. It is certainly possible to consider replacing this layer (totally or partially) by ITO or $SnO_2$:F in order to retain its optical function while at the same time again increasing the conductivity of the entirety of the layers 25(*a*), 25(*b*) and 25(*c*) in the multicomponent electrode.

The second electrode 30' is also a multilayer stack, for example one laid down by cathodic sputtering and composed of a first 50 nm layer 30(*a*) of ITO, of a second 10 nm layer 30(*b*) of silver and finally of a third 34 nm layer 30(*c*) of ITO. It is preferable here for the layer 30(*a*) and the layer 30(*c*) to be conducting, although they fulfil the same optical function with respect to the Ag layer 31(*a*) as the layers 25(*a*) and 25(*c*) with respect to the silver layer 25(*b*), since it is simpler to terminate the stack in a conducting layer to which the connecting elements can be affixed, these being here the metallic shims arranged on the sheet of polymer serving as a lamination intercalation.

Prior to the invention, a system of this type operated with a first 150 nm layer of ITO (adjacent to glass pane 21) and a second 300 nm layer of ITO (adjacent to PU 24). It can be seen, therefore, that the invention allows the use of much thinner layers of ITO or of $SnO_2$:F, and this has a significant impact on the cost of the final glazing. The invention also allows the use of Ag layers with high electrical performance, but without the known disadvantages of these (very reflective appearance, a certain degree of fragility, etc.).

What is claimed is:

1. An electrochemical device comprising:
   at least one electronically conducting layer comprising at least one metal oxide;
   a multicomponent electrode comprising at least one electrochemically active layer and at least one network of conducting strips, wherein:
   the at least one electronically conducting layer and the multicomponent electrode are arranged between two rigid or semi-rigid substrates, the substrates comprising at least one of glass and a polymer; and
   the at least one electronically conducting layer comprises zinc oxide doped with aluminum or fluorine.

2. The electrochemical device of claim 1, wherein:
   the substrates comprise polycarbonate.
3. The electrochemical device of claim 1, wherein:
   the substrates comprise methyl polymethacrylate.
4. The electrochemical device of claim 1, wherein:
   the at least one electronically conducting layer and the at least one electrochemically active layer are transparent.
5. The electrochemical device of claim 1, wherein:
   the at least one electronically conducting layer and the at least one electrochemically active layer are absorbent.
6. The electrochemical device of claim 4, wherein:
   the at least one electronically conducting layer and the at least one electrochemically active layer are absorbent.
7. The electrochemical device of claim 1, wherein:
   the at least one network comprises a plurality of silver-based conducting strips.
8. An electrochemical device comprising:
   at least one electronically conducting layer comprising at least one metal oxide;
   a multicomponent electrode comprising at least one electrochemically active layer and at least one network of conducting strips, wherein:
   the at least one electronically conducting layer and the multicomponent electrode are arranged between two rigid or semi-rigid substrates, the substrates comprising at least one of glass and a polymer; and
   the at least one network comprises a plurality of silver-based conducting strips obtained using a low melting point frit in an organic binder.
9. The electrochemical device of claim 1, wherein:
   the multicomponent electrode further comprises current leads in the form of metal braids or shims.
10. The electrochemical device of claim 1, wherein:
    the at least one electronically conducting layer comprises tin oxide doped with fluorine or antimony.
11. The electrochemical device of claim 1, wherein:
    the at least one electronically conducting layer comprises indium oxide doped with tin.
12. An electrochemical device comprising:
    at least one electronically conducting layer comprising at least one metal oxide;
    a multicomponent electrode comprising at least one electrochemically active layer and at least one network of one of conducting wires and conducting strips, wherein:
    the at least one electronically conducting layer and the multicomponent electrode are arranged between two substrates, at least one of the substrates being flexible; and
    the at least one electronically conducting layer comprises zinc oxide doped with aluminum or fluorine.
13. The electrochemical device of claim 12, wherein:
    the at least one flexible substrate comprises polyethylene terephthalate.
14. The electrochemical device of claim 12, wherein:
    the at least one network comprises a plurality of essentially metallic wires surface-laid on a thermoplastic polymer.
15. An electrochemical device comprising:
    at least one electronically conducting layer comprising at least one metal oxide;
    a multicomponent electrode comprising at least one electrochemically active layer and at least one network of one of conducting wires and conducting strips, wherein:

the at least one electronically conducting layer and the multicomponent electrode are arranged between two substrates, at least one of the substrates being flexible; and the at least one network comprises a plurality of silver-based conducting strips obtained using a low melting point frit in an organic binder.

16. The electrochemical device of claim 12, wherein:
the multicomponent electrode further comprises current leads in the form of metal braids or shims.

17. The electrochemical device of claim 12, wherein:
the at least one electronically conducting layer comprises tin oxide doped with fluorine or antimony.

18. The electrochemical device of claim 12, wherein:
the at least one electronically conducting layer comprises indium oxide doped with tin.

19. An electrochemical energy storage device comprising:
at least one electronically conducting layer comprising at least one metal oxide;

a multicomponent electrode comprising at least one electrochemically active layer, at least one network of one of conducting wires and conducting strips, and a perforated metallic sheet or grid.

* * * * *